No. 865,998. PATENTED SEPT. 17, 1907.
E. M. COOK.
METALLIC PACKING.
APPLICATION FILED JAN. 7, 1907.
Fig. 1.
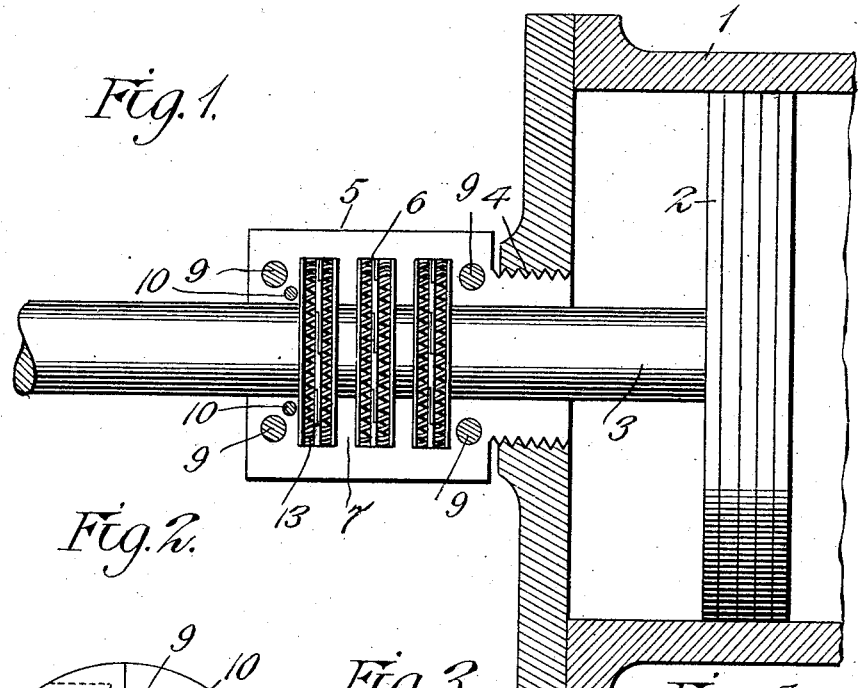
Fig. 2.
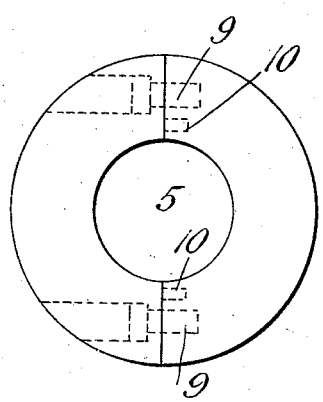
Fig. 3.
Fig. 4.
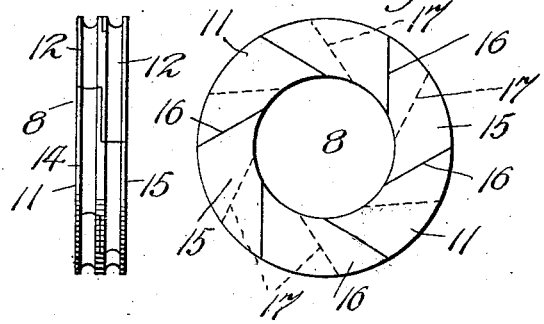
Fig. 5.
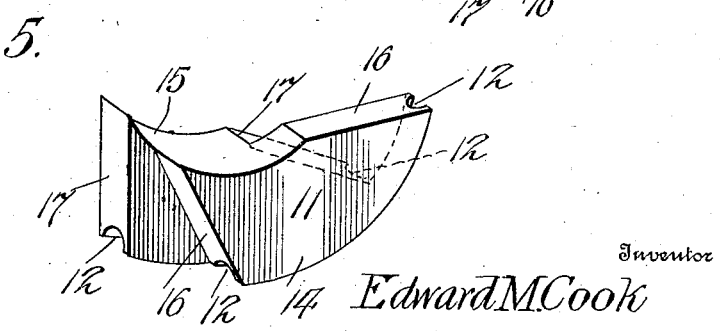
Inventor
Edward M. Cook
Witnesses
By Victor J. Evans
Attorney

UNITED STATES PATENT OFFICE.

EDWARD M. COOK, OF OBERLIN, OHIO.

METALLIC PACKING.

No. 865,998.     Specification of Letters Patent.     Patented Sept. 17, 1907.

Application filed January 7, 1907. Serial No. 351,153.

*To all whom it may concern:*

Be it known that I, EDWARD M. COOK, a citizen of the United States of America, residing at Oberlin, in the county of Lorain and State of Ohio, have invented new and useful Improvements in Metallic Packing, of which the following is a specification.

This invention relates to metallic packings, particularly of that type employing expansible rings composed of adjustable segments held assembled and permitted to expand and contract by coacting springs, the present invention constituting an improvement upon the construction of packing ring disclosed in my United States Letters Patent No. 812,114, granted February 6, 1906, in which is described and claimed a packing ring composed of a single set of segments having engaging ends formed to provide radial cuts on one side of the ring and tangential cuts on the other side of the ring.

The object of the present invention is to improve the construction of packing ring shown in the aforesaid patent by the provision of a ring composed, as disclosed therein, of a single set of segments, said segments, however, being of novel and peculiar construction, in that the engaging ends thereof are formed to provide tangential cuts on both sides of the ring, said cuts being disposed upon lines between each other so as to break joint around the surface of the ring, whereby free expansion and contraction of the ring is permitted, while absolutely closed joints are formed upon both sides thereof at all times in the expansion and contraction of the ring to prevent passage of the steam or other medium between the joints at either side.

The preferred embodiment of the invention is illustrated in the accompanying drawing, in which,—

Figure 1 is a central longitudinal section through one end of a cylinder and the packing cage, showing the application of the invention. Fig. 2 is a side view of the cage. Fig. 3 is an edge view of one of the packing rings. Fig. 4 is a side view thereof. Fig. 5 is a perspective view of one of the ring-segments.

The improved packing ring is designed for use within a packing box disposed within a packing chamber, as disclosed in my aforesaid patent, or within a cage adapted for removable engagement with the bore of a cylinder to surround a piston rod, as disclosed in the present instance, 1 denoting the cylinder, 2 the piston operating therein, 3 the piston rod, 4 a threaded bore or opening in one end of the cylinder, and 5 the packing cage. This cage is preferably of the construction shown in my application for Letters Patent filed Sept. 22, 1906, Serial Number 335,764, and allowed November 26, 1906, said cage being provided with a plurality of internal annular grooves 6 and intervening walls or flanges 7 to hold a series of packing rings 8 and comprising a cylindrical body divided longitudinally to provide two semi-cylindrical sections united by connecting bolts 9 and dowel pins 10, the sections being formed at one end with semi-cylindrical extensions externally threaded to provide a screw sleeve fitted within the bore or opening 4, the cage being arranged to inclose the rod 3 upon the exterior of the cylinder.

Each packing ring 8 is composed of a single set or series of segments 11, and is provided on opposite sides of the center with annular grooves 12 to receive endless coiled springs 13, which hold the segments assembled and draw them together to compensate for wear. The rings encompass the rods 3 and are maintained in close engagement therewith by the springs.

Each segment 11 is composed of two members or parts 14 and 15, disposed in parallel relation and each integrally joined at its inner end to the inner end of the other, one set of members forming one side and the other set the opposite side of the body of the ring. The outer ends of the members 14 and 15 project in opposite directions and connect the segments when assembled together in such manner as to break joint, thus holding them when coupled by the springs against lateral movement. The ends 16 and 17, respectively, of both members 14 and 15 are beveled in substantially parallel planes or inclined at angles which are tangential to the ring, so that the segments when coupled to form the ring will be provided on opposite sides with alternately arranged scarf-joints on which the respective segments are adapted to ride as the ring expands and contracts under variations of temperature and to compensate for wear. Cuts or divisions will thus be formed on opposite sides of the ring which are tangential to the ring and arranged on lines between each other, so that the cuts or divisions on one side of the ring will be between or break joint with the cuts or divisions on the opposite side of the ring, and will also incline in the same general direction around the surface of the ring, thus adapting the segments to be conveniently formed and machined at a comparatively little trouble and expense. As a result of this construction, the beveled faces forming the tangential divisions on both sides of the ring may ride freely in contact with each other in the contraction and expansion of the ring without producing open joints at either side, thus keeping the joints tight against the passage of steam or other medium on both sides irrespective of the degree of expansion and contraction of the ring.

Having thus described the invention, what is claimed as new, is:—

1. A packing ring composed of a single set of segments having engaging ends, said ends being formed to provide tangential cuts on both sides of the ring, said cuts inclining generally in the same direction around the surface of the ring.

2. A packing ring composed of a single set of segments having engaging ends, said ends being formed to provide tangential cuts on both sides of the ring, the cuts on one side alternating in arrangement with the cuts on the other side, so that the cuts break joint around the surface of the ring, both sets of cuts inclining generally in the same direction around the surface of the ring.

3. A packing ring comprising a single set of segments, each composed of two parallel integral parts, said parts having their ends tangentially beveled in substantially parallel planes to produce tangential cuts on opposite sides of the ring, the cuts on one side being arranged on lines between the cuts on the opposite side, so as to break joint and incline in the same general direction around the surface of the ring.

4. A packing ring formed of segments having contact faces arranged to provide substantially parallel sets of tangential cuts or divisions on opposite sides of the ring, the cuts of each set alternating in arrangement with each other, so as to break joint and incline in the same general direction around the surface of the ring.

In testimony whereof, I affix my signature in presence of two witnesses.

EDWARD M. COOK.

Witnesses:
F. H. CARVER,
LOUIS E. BURGNER.